United States Patent
Groff et al.

(10) Patent No.: US 8,266,604 B2
(45) Date of Patent: Sep. 11, 2012

(54) TRANSACTIONAL MEMORY COMPATIBILITY MANAGEMENT

(75) Inventors: Dana Groff, Sammamish, WA (US); Yosseff Levanoni, Redmond, WA (US); Stephen Toub, Seattle, WA (US); Michael McKenzie Magruder, Carnation, WA (US); Weirong Zhu, Kirkland, WA (US); Timothy Lawrence Harris, Cambridge (GB); Christopher William Dern, Kirkland, WA (US); John Joseph Duffy, Renton, WA (US); David Detlefs, Issaquah, WA (US); Martin Abadi, Palo Alto, CA (US); Sukhdeep Singh Sodhi, Redmond, WA (US); Lingli Zhang, Redmond, WA (US); Alexander Dadiomov, Redmond, WA (US); Vinod Grover, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 900 days.

(21) Appl. No.: 12/359,492

(22) Filed: Jan. 26, 2009

(65) Prior Publication Data

US 2010/0191930 A1   Jul. 29, 2010

(51) Int. Cl.
*G06F 12/00* (2006.01)
*G06F 9/44* (2006.01)

(52) U.S. Cl. ........................... 717/146; 711/170
(58) Field of Classification Search .................. 717/146
See application file for complete search history.

(56) References Cited

U.S. PATENT DOCUMENTS

| | | | |
|---|---|---|---|
| 7,908,265 B2 * | 3/2011 | Abadi et al. | 707/713 |
| 8,024,714 B2 * | 9/2011 | Duffy et al. | 717/136 |
| 8,032,870 B2 * | 10/2011 | Detlefs | 717/131 |
| 2004/0024610 A1 | 2/2004 | Fradkov et al. | |
| 2006/0271941 A1 * | 11/2006 | Bernabeu-Auben et al. | 719/330 |
| 2007/0055960 A1 * | 3/2007 | Damron et al. | 717/131 |
| 2007/0100967 A1 * | 5/2007 | Smith et al. | 709/219 |
| 2007/0156716 A1 * | 7/2007 | Said et al. | 707/100 |
| 2007/0169030 A1 * | 7/2007 | Tarditi et al. | 717/140 |
| 2007/0169031 A1 * | 7/2007 | Harris | 717/140 |
| 2007/0300238 A1 * | 12/2007 | Kontothanassis et al. | 719/320 |
| 2008/0034172 A1 * | 2/2008 | Duffy et al. | 711/156 |
| 2008/0120484 A1 | 5/2008 | Zhang et al. | |

(Continued)

FOREIGN PATENT DOCUMENTS

WO    WO 2007067390 A2 *  6/2007

OTHER PUBLICATIONS

McDonald, et al. "Architectural Semantics for Practical Transactional Memory", Retrieved at<<http://ogun.stanford.edu/~kunle/publications/tcc_isca2006.pdf>>, pp. 12.

(Continued)

*Primary Examiner* — Isaac Tecklu
*Assistant Examiner* — Theodore Hebert
(74) *Attorney, Agent, or Firm* — Ogilvie Law Firm

(57) ABSTRACT

Transactional memory compatibility type attributes are associated with intermediate language code to specify, for example, that intermediate language code must be run within a transaction, or must not be run within a transaction, or may be run within a transaction. Attributes are automatically produced while generating intermediate language code from annotated source code. Default rules also generate attributes. Tools use attributes to statically or dynamically check for incompatibility between intermediate language code and a transactional memory implementation.

19 Claims, 3 Drawing Sheets

U.S. PATENT DOCUMENTS

| | | | |
|---|---|---|---|
| 2008/0120590 A1* | 5/2008 | Wang et al. | 717/100 |
| 2008/0126764 A1* | 5/2008 | Wu et al. | 712/226 |
| 2008/0162886 A1* | 7/2008 | Saha et al. | 712/214 |
| 2008/0244544 A1* | 10/2008 | Neelakantam et al. | 717/147 |
| 2008/0301664 A1* | 12/2008 | Callahan et al. | 717/170 |
| 2009/0007057 A1* | 1/2009 | Taillefer | 717/104 |
| 2009/0007070 A1* | 1/2009 | Magruder et al. | 717/120 |
| 2009/0282386 A1* | 11/2009 | Moir et al. | 717/106 |
| 2009/0313612 A1* | 12/2009 | Vick et al. | 717/136 |
| 2009/0319739 A1* | 12/2009 | Shpeisman et al. | 711/163 |
| 2010/0146480 A1* | 6/2010 | Kalogeropulos et al. | 717/106 |

OTHER PUBLICATIONS

Ali, et al. "Unlocking Concurrency", Retrieved at<<http://csl.stanford.edu/~christos/publications/2006.unlocking_concurrency.queue.pdf>>, ACM, Dec./Jan. 2006-2007, pp. 24-34.

Jones Simon, "Transactional Memory for Concurrent Programming", Retrieved at<<http://itc.conversationsnetwork.org/shows/detail3368.html>>, Jul. 25, 2007, p. 1.

McDonald, et al. "Transactional Memory: The Hardware-Software Interface", Retrieved at<<http://ieeexplore.ieee.org/iel5/40/4205111/04205125.pdf?tp=&isnumber=&arnumber=4205125>>, 2007 IEEE, pp. 67-76.

".IBM XL C/C++ for Transactional Memory for AIX, V0.9", Retrieved at<<http://dl.alphaworks.ibm.com/technologies/xlcstm/xlcstm-whitepaper.pdf>>, May 2008, pp. 18.

"Intel C++ STM Compiler, Prototype Edition 2.0", Retrieved at<<http://softwarecommunity.intel.com/articles/eng/1460.htm>>, Aug. 25, 2008, pp. 4.

* cited by examiner

TRANSACTIONAL MEMORY COMPATIBILITY MANAGEMENT

BACKGROUND

Sometimes a computational problem can be divided into pieces in a way that allows a system to work on more than one piece at a time. For example, concurrent computing simultaneously carries out multiple computing tasks, such as multiple threads or multiple processes. Similarly, parallel computing systems carry out multiple instructions simultaneously. Parallel computing may be viewed as an example of concurrent computing, and the distinction between them is not critical here.

Various tools and techniques are used to coordinate the pieces of a divided computational problem. In particular, transactional memory may be used to control access to shared memory. Transactional memory supports a way to abstractly express what memory operations operate with a transactional behavior. In some transactional memory implementations, code in a transaction executes a series of reads and writes to shared memory which appear from outside the transaction to happen atomically. That is, either all of the code in a transaction completes (transaction succeeded), or else work done by the code before the transaction fails is undone, so the view from outside the transaction is that none of the code completed (transaction failed).

In some situations, code is initially designed and written to run on a transactional memory system, while in other situations the possibility of running particular code on a transactional memory implementation arises after that code has already been designed and written. Some code is also less amenable to transactional execution than other code. For example, it may be difficult or impossible to undo work done by code that transmits data over a network or code that changes the state of a peripheral device.

SUMMARY

To help make effective use of transactional memory, transactional memory compatibility type attributes are associated with intermediate language code. In some embodiments, an attribute may specify, for example, that a given portion of intermediate language code must be run within a transaction, or that the code must not be run within a transaction, or that the code may be run within a transaction but can also be run without using a transaction. The attributes can be automatically generated for a runtime environment, such as a Microsoft .NET runtime or a Mono runtime, on a system that includes transactional memory, while generating the intermediate language code from annotated source code (.NET is a mark of Microsoft Corporation, and Mono is a mark of Novell, Inc.). Default rules may also be used to generate attributes, e.g., by associating a must-not-be-in-transaction attribute with code such as kernel calls that have effects beyond the control of the runtime environment.

A runtime environment may respond to transactional memory compatibility attributes in various ways. For example, the runtime may suppress an ambient transaction, may marshal data for read-only use by a transaction suppressed region, and/or may dynamically redirect control from an invocation based on whether the invocation occurs within a transaction. The attributes may also be used to statically and/or dynamically check for incompatibility between intermediate language code and a transactional memory implementation.

The examples given are merely illustrative. This Summary is not intended to identify key features or essential features of the claimed subject matter, nor is it intended to be used to limit the scope of the claimed subject matter. Rather, this Summary is provided to introduce - in a simplified form— some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
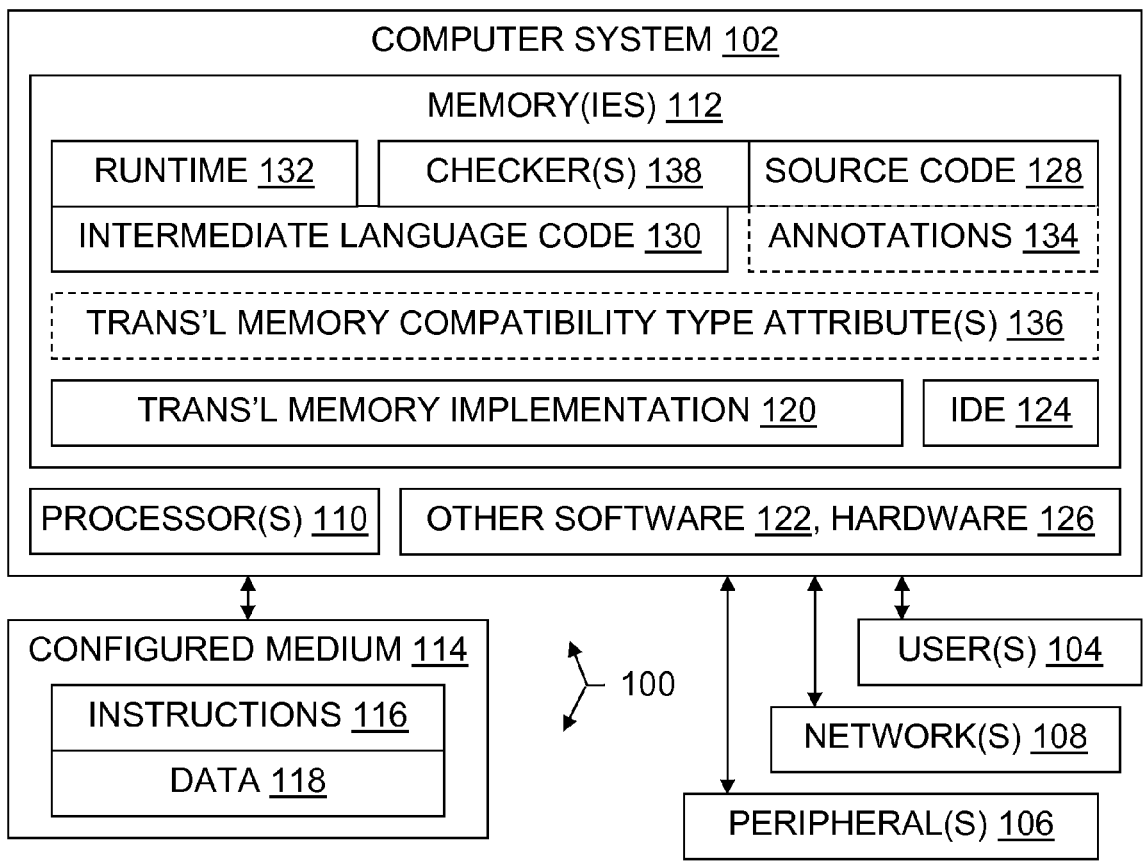
FIG. 1 is a block diagram illustrating a computer system having a runtime environment, a transactional memory implementation, source code, corresponding intermediate language code, and other items in an operating environment, and also illustrating configured storage medium embodiments.

With the increased use of concurrent programming and multi-core processors, transactional memory is gaining traction as a means of mitigating shared memory synchronization problems. Programmers are writing programs with fine-grained parallel execution contexts. When managing access to shared state, however, lock-based methods are difficult to get correct and do not compose over multiple modules. Transactional memory offers an implicit fine-grained alternative to explicit lock-based synchronization, thereby providing programmers with an easy-to-use programming model. Transactional memory implementations may allow programmers to express synchronization and to manage failures with greater reliability, scalability and ease of use than lock-based alternatives.

In some views, transactional memory systems guarantee to a programmer the properties of atomicity, consistency and isolation. Atomicity refers to the ability of the transactional memory system to make it appear that either all the operations in a transaction were executed, or none were. A transactional memory system may provide strong atomicity or weak atomicity, for example. Strong atomicity guarantees atomicity and isolation between transactions and non-transactional code by making all non-transactional work access memory as if it were in a transaction, while weak atomicity guarantees atomicity and isolation between transactions. In one view, consistency refers to the fact that transactions appear to operate against a consistent snapshot of memory, where no other thread is writing to any of the shared memory locations. Consistency may also mean that when code is updating multiple transactional resources (tables, tables and indices, files and databases, etc.), all of the updates made within a single transaction are made available at the same time, as part of the committing action; in some views, this is isolation, not consistency. Some argue that consistency doesn't pertain to transactional memory, but is instead the job of the application, arguing that in databases consistency is guaranteed through a constraint system which is not available to the transactional memory programmer. Isolation may also refer to the fact that the effect of memory writes made by a transaction are not visible to other transactions until the writes are committed. Regardless of variations in terminology, it is generally agreed that the transaction system makes it appear that these updates occurred all at once. Any other transaction attempting to read two objects in memory at the same time these objects are being committed will not see one object updated and one that has not yet been updated.

Transactional memory may simplify parallel programming. Transactional memory may provide the ability to compose arbitrary pieces code, across different layers of abstraction, without risk of deadlock. Transactional memory may provide the programmer the ability to abstractly declare arbitrary regions of code as isolated from the effects of other code. Otherwise, programmers may need to do this with explicit locks, which leads to a risk of deadlock. Transactional memory may free the programmer from introducing this risk. Further, by providing atomicity, consistency and isolation characteristics to selected pieces of code, the programmer may be able to combine modules into atomic units of work. The programmer does this by specifying that a section of code operates within a transaction. Either all of that transactional code completes, or none of it completes, from the perspective of code outside the transaction. If a failure occurs, all memory operations are undone. While the work is being done, other transactional code cannot see the transaction's work-in-progress.

However, transactional guarantees cannot necessarily be applied to all of the work done in a program. Some kinds of work are incompatible with transactional memory. Existing system calls, durable resources, device operations, network operations, and so on cannot always be undone or otherwise fully managed by a transaction. Transactional memory may be unsuitable for code which communicates with other processes or makes changes to system state. Except when working with transactional resources such as a transactional registry or a transactional file-system, such actions do not provide isolation of the transacted code's changes from threads outside of the transaction. Common examples include writing to the console, reading or writing data to a traditional file, sending data over the network, or even taking a lock on a system resource. In some cases these actions can be undone but they are not inherently isolated. By contrast, work which is suitable for transactions includes updating large collections or executing logic that checks the state of one or many objects and then modifies those objects or others.

Some embodiments described herein demonstrate how a programmer can use annotations to safely indicate which sections of code are to be run within a transaction, and how the programmer can detect calls made to incompatible sections of code. Hence, additions to support transactional memory can be made to a legacy programming language and/or runtime, despite existing libraries and code, without risking unexpected behavior when incompatible code is included in a transactional memory region.

In addition to providing correctness guarantees for existing code, annotations may be used to provide hints to the runtime which allow it to optimize its algorithms for performance and scalability. For instance, hypothetical implementations of Software Transactional Memory (STM) may provide protections and guarantees for objects that could be used both within a transaction and outside of a transaction. If annotations explicitly indicate that an object must be used within a transaction, performance optimizations may be made in the runtime. The programmer or tools the programmer uses may also benefit by being able to detect incorrect usage of the object outside of a transaction.

Transactional memory may be implemented in different ways with different results, particularly for variables which are accessed both within a transaction and outside a transaction. Different transactional memory implementations may be designed to follow different semantic models. For instance, the semantics of atomicity may differ from one transactional memory implementation to another. Transactional memory may also be implemented in various forms, with special-purpose hardware, in software on general-purpose hardware, or with a combination of software and special-purpose hardware, for example. Annotations and other aspects of a given embodiment may be used with different transactional memory implementations, in identical or adapted forms, as deemed appropriate by the developers involved.

Some embodiments described herein provide annotations to define compatible and incompatible code for use with transactional memory as a new language feature. Some embodiments use annotations to specify which methods or functions must be run within a transaction, which may be run within a transaction, which must never be run within a transaction, and annotation to ignore (suppress) a transaction if one exists. Some embodiments provide transactional memory semantics to regions of code through a try/catch mechanism that indicates the runtime should encase the code within a transaction. Some embodiments provide methods which take function pointers, lambdas or delegates to run within a transaction. Some embodiments take the form of tools which analyze source code and generate warnings or errors when incompatible code could be referenced within a transaction; some support dynamic checks of transactional memory compatibility. Some specific annotations specify objects or fields that must be used in a transaction. With some embodiments, a programmer can detect errors in the use of those objects early at compile time, and a runtime can provide execution optimizations as well as detecting invalid use of an object in relationship to its use with transactional memory blocks. The foregoing are merely some examples of various embodiments and their features.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

Throughout this document, use of the optional plural "(s)" means that one or more of the indicated feature is present. For example, "attribute(s)" means "one or more attributes" or equivalently "at least one attribute".

"Code" means processor instructions, data (which includes constants, variables, and data structures), or both instructions and data.

Whenever reference is made to data or instructions, it is understood that these items configure a computer-readable memory, as opposed to simply existing on paper, in a person's mind, or as a transitory signal on a wire, for example.

Operating Environments

With reference to FIG. 1, an operating environment 100 for an embodiment may include a computer system 102. The computer system 102 may be a multiprocessor computer system, or not. An operating environment may include one or more computer systems, which may be clustered, client-server networked, and/or peer-to-peer networked. Some operating environments include a stand-alone (non-networked) computer system.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more memories 112. The memories 112 may be volatile, non-volatile, fixed in place, removable, magnetic, optical, and/or of other types. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a memory 112. Other examples of memory 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the memory 112/medium 114 in which they reside; when that memory is a functional part of a given computer system, the instructions 116 and data 118 also configure that computer system.

Memories 112 may be of different physical types. Transactional memory implementations 120, kernel(s) and other software 122, and other items shown in the Figures may reside partially or entirely within one or more memories 112, thereby configuring those memories.

Although the transactional memory implementation 120 is depicted in memory 112 in FIG. 1, a given transactional memory implementation 120 may include software 122 and/or hardware 126. A transactional memory implementation 120 may be provided, for example, by a runtime 132 which implements some form of transactional memory. Transactional memory may also be implemented with special-purpose hardware. Transactional memory may be utilized in some cases when the programmer designates a region of code as being transacted, e.g., by using an "atomic { }" keyword or similar construct.

A given operating environment 100 may include an Integrated Development Environment (IDE) 124 which provides a developer with a set of coordinated software development tools. In particular, some of the suitable operating environments for some embodiments include or help create a Microsoft® Visual Studio® development environment (marks of Microsoft Corporation) configured to support source code development. Some suitable operating environments include Java® environments (mark of Sun Microsystems, Inc.), and some include environments which utilize languages such as C++ or C# ("C-Sharp"), but teachings herein are applicable with a wide variety of programming languages, programming models, and programs, as well as with endeavors outside the field of software development that use transactional memory. An IDE is not necessary in an end-user system, generally being used only in a developer system.

The illustrated operating environment 100 includes computer software source code 128, which may be written in one or more programming languages. Intermediate language code 130 corresponds to at least some of the source code 128, e.g., by virtue of having been automatically generated from the source code by a compiler, interpreter, debugger, optimizer, or similar tool. Intermediate language code 130 may also be written, or at least tweaked, manually by a developer in some cases. Intermediate language code may be human-readable, or not human-readable, depending on the situation. A runtime environment, also referred to simply as a runtime 132, is designed to execute the intermediate language code 130. The runtime may include one or more virtual machines, for example.

Based on the illustrated operating environment, a given embodiment may include source code annotations 134 which indicate actual (or expected) compatibility of source code portions with transactional memory execution. The annotations 134 are useful not only in documenting programmer intentions and understandings, but also in automatically generating transactional memory compatibility type attributes 136 which are recognized by an appropriately enhanced runtime 132. Based on the attributes 136, the runtime 132 may automatically provide optimizations, warnings, and other responses to the programmer intentions and understandings regarding transactional execution of particular portions of code, as discussed herein. Static and/or dynamic checks for inconsistencies regarding transactional memory can be performed by one or more checkers 138. Specific programs and other software 122 and other hardware 126 than that already enumerated may also be present.

Systems

Figure 2:
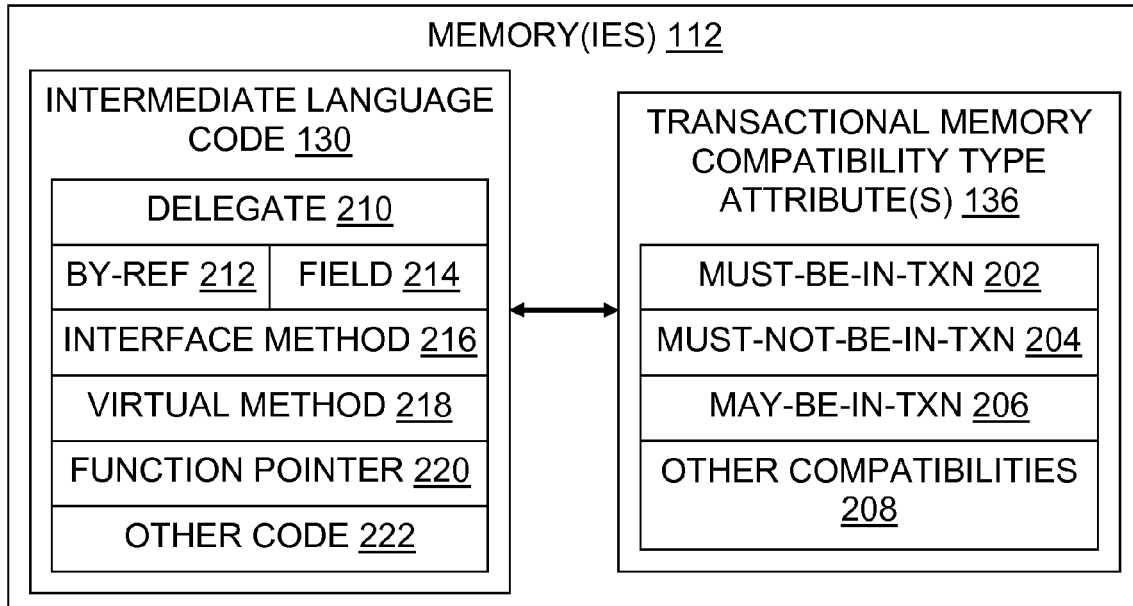
FIG. 2 is a block diagram further illustrating intermediate language code and associated transactional memory compatibilities.

With regard to FIGS. 1 and 2, in some embodiments peripherals 106 such as human user I/O devices (screen, keyboard, mouse, microphone, speaker, motion sensor, etc.) will be present in operable communication with one or more processors 110 and memory 112. However, an embodiment may also be deeply embedded in a system, such that no human user 104 interacts directly with the embodiment. Software processes may also be considered as users 104.

In some embodiments, networking interface equipment provides access to networks 108, using components such as a packet-switched network interface card, a wireless transceiver, or a telephone network interface, for example, will be present in the computer system. However, an embodiment may also communicate through direct memory access, removable nonvolatile media, or other information storage-retrieval and/or transmission approaches, or an embodiment in a computer system may operate without communicating with other computer systems.

Some embodiments include a computer system 102 configured for transactional memory support. The system includes a memory 112 and a logical processor 110 in operable communication with the memory. Intermediate language code 130 configures the memory. The intermediate language code 130 includes human-readable code which is intermediate between programming language source code and bytecode. At least one transactional memory compatibility type attribute 136 is associated in the memory with a portion of the intermediate language code, e.g., through links of the kind used to associate other attributes with intermediate language code objects. The transactional memory compatibility type attribute 136 specifies a particular compatibility between the intermediate language code portion and a transactional memory implementation 120.

Compatibilities are not necessarily limited to the two opposing possibilities of "compatible" and "incompatible". For example, as illustrated by FIG. 2 some embodiments include the following compatibility-specifying attributes associated in the memory with intermediate language code portions: must-be-in-transaction compatibility 202, must-not-be-in-transaction compatibility 204, may-be-in-transaction compatibility 206. Other compatibilities 208 between code and transactional memory usage may also be specified in some embodiments, e.g., in the form of a contract. Some embodiments include a do-not-check-transaction compatibility 208 attribute. The compatibility/attribute names and other names used herein may differ from names used in a given embodiment to designate functionally equivalent items.

Attributes 136 may be associated with various kinds of intermediate language code 130, as FIG. 2 also illustrates. For example, in some embodiments a transactional memory compatibility type attribute 136 is associated in the memory 112 with intermediate language code for at least one of the following: a delegate 210, a by-ref variable 212, a field of a class 214, an interface method 216, a virtual method 218, a function pointer 220. Other code 222, such as regular methods, properties, and events, may also have associated transactional memory compatibility type attributes 136.

In some embodiments, the memory 112 is configured by a source code 128, the intermediate language code 130 is generated at least in part from the source code, and the transactional memory compatibility type attribute 136 is specified in the source code by an annotation 134. In some embodiments, the memory 112 holds a software 122 program designed to use transactional memory compatibility source code annotations 134 to automatically generate documentation, e.g., reports on use of the intermediate language target code corresponding to the source code within a system which implements a transactional memory.

In some embodiments, a programmer can use attribute annotations 134 to explicitly define a "contract" regarding the expected and acceptable behavior of code with regard to transactional memory usage. For example, annotations 134 may be implemented using definitions such as the following:

```
public sealed class AtomicSupportedAttribute { }
public sealed class AtomicRequiredAttribute { }
public sealed class AtomicNotSupportedAttribute { }
```

"Atomic" refers to an atomic region, e.g., a transaction. These attributes may be used on constructors, delegates, fields, methods, parameters, return values, structs, and/or other code, in a given embodiment. The AtomicRequiredAttribute corresponds generally to must-be-in-transaction compatibility 202, and indicates that the code in question must be executed in an existing enclosing atomic block which is not suppressed. The AtomicNotSupportedAttribute corresponds generally to must-not-be-in-transaction compatibility 204, and indicates that there must not be an existing enclosing atomic block, or that such a block if present has been suppressed. The AtomicSupportedAttribute corresponds generally to may-be-in-transaction compatibility 206, and indicates that the associated code may or may not be in an existing enclosing atomic block.

In a typical computing environment, such as a Microsoft .NET environment, code is organized in hierarchical structures. At the top of the hierarchy there are assemblies. Types are the next level, themselves residing within assemblies. Then inside types, nested types and methods can be defined. An embodiment may allow the specification of a default contract in all, none or some of these levels and it may specify rules for determining which default values are allowed in each level in the hierarchy. In one particular embodiment, a default value of either Supported or NotSupported is specifiable at the assembly level. This default is then applied to certain items that are defined within the assembly and do not have explicit annotations. For example, an assembly-level default can be overridden freely, e.g., by specifying that almost all of an assembly is AtomicNotSupported, but this specification is overridden to AtomicSupported on a case-by-case basis.

In some embodiments, only one atomic contract may be declared for a given assembly. Attributes are inherited, and the compatibility specified by an attribute can only be overridden in specified ways. AtomicRequired compatibility cannot be overridden; AtomicNotSupported compatibility cannot be overridden; and AtomicSupported compatibility can be overridden by AtomicRequired. Any compatibility can "override" itself, that is, a duplicate annotation X on code already within the scope of annotation Y has no effect when the two annotations specify the same compatibility 208. In some embodiments, atomic contract attributes are not directly inherited but are subject to usage rules, which are discussed later in connection with static compatibility checking. In some embodiments with object-oriented programming systems, a derived type must adhere at the very least to the contract set forth by a base type. In such embodiments, if a virtual method M is in class A and class B derives from A and overrides M, then the following transitions from A::m to B::m are allowed:

---
Required -> Required | Supported
NotSupported -> NotSupported | Supported
Supported -> Supported

---

This ensures that A could be substituted with a B without the user experiencing any degradation in the guarantees provided to the user.

In some embodiments the programmer may explicitly specify an unchecked contract on virtual and interface methods. In some embodiments, in the absence of any annotation the contract on virtual and interface methods may default to unchecked. In some embodiments the static checker may skip static analysis for methods marked unchecked. The unchecked contract may be implemented with the following:
public sealed class AtomicUncheckedAttribute { }
In some embodiments if a virtual or interface method is annotated with the AtomicUnchecked attribute it can be overridden or implemented by a method that has one of AtomicSupported, AtomicRequired or AtomicNotSupported contracts.

Compatibility contracts assigned by default in the absence of an annotation are also known herein as inferred contracts. An inconsistency in transactional memory compatibilities is also known herein as a contract violation.

In some embodiments the rules for instance constructors are identical to those of methods. That is, if an assembly containing a constructor supports transactions and the constructor is not annotated, then its contract by default is AtomicSupported. If the assembly is not annotated, then the constructor is by default assigned AtomicNotSupported compatibility.

In some embodiment, static constructors are not run within a transaction and should not be annotated otherwise. In some systems, static constructors are always considered AtomicNotSupported and are executed only outside of transactions. In such embodiments it is permissible for the system to speculate that a type is about to be accessed in a transaction and invoke the type's static constructor before the transaction is executed.

In some embodiments, a delegate type may designate its atomic contract. Assignments made to delegates annotated as AtomicRequired may only accept methods that have either AtomicSupported or AtomicRequired compatibility. Assignments made to delegates annotated as AtomicSupported may only accept methods that are AtomicSupported. Assignments made to delegates annotated as AtomicNotSupported may only accept methods that are either AtomicSupported or AtomicNotSupported, thereby allowing the delegate to be invoked safely based on the contract of the delegate type. Lambdas and anonymous methods created by some compilers, such as the Microsoft C# compiler, cannot be assigned attributes but some embodiments derive the attribute from the delegate type that these methods are assigned to. Alternatively, the contract of these compiler generated methods can be inferred from their usage within the code when statically checking source code or IL.

In some embodiments, a delegate type that is not annotated has no default contract; it may be viewed as having an undecided or unchecked compatibility. In some embodiments, the AtomicUnchecked contract may be explicitly placed on delegate types. However, a runtime checker may still be able to check that an incompatible method hasn't been invoked through the delegate, at runtime.

In some embodiments, a field may designate its atomic contract through an annotation. The field's contract specifies whether the field may, must, or must-not be accessed within an atomic block. A field that has no explicit contract defined has by default a contract of AtomicSupported.

In some embodiments, a struct is a value type. In some embodiments, a programmer may not place contracts on fields within the struct.

In some embodiments, a method may designate its compatibility as a contract. A method's contract specifies whether it may, must, or must not be called within an atomic block. In some embodiments, a method that has no explicit contract and that is defined within an assembly which is annotated as "AtomicAware" has by default the AtomicSupported contract, and the method by default has the AtomicNotSupported contract if the method is in an assembly that is not annotated as AtomicAware.

In some embodiments, a property has no contract. However, property set and get methods may have contracts as they are a form of a method. In some embodiments, contracts are available for pointer and by-ref parameters, e.g., in some Microsoft NET embodiments if code gets a pointer of type int*p, an annotation is used to indicate to whether p points to memory that may, must, or must not be accessed within transactions.

In some embodiments, class definitions cannot be annotated. In some, each scope (such as a class) may introduce a default compatibility covering members of that scope.

In some embodiments, events are not annotated, but event 'add' and 'remove' handlers, which are used for the registration of event handlers, may be annotated, as these handlers are a form of a method. Event handlers are typically aggregated by 'add' and 'remove' handlers into a variable of type multi-cast delegate. Event invocation is simply the invocation of the multi-cast delegate stored in the variable associated with the event. Thus, event invocation may be allowed or disallowed in transactions depending on the contract of the multi-cast delegate type and the contract of the field(s) in which the multi-cast delegate reference is stored.

In some embodiments, contracts can be defined for interface methods. As with class inheritance, classes which implement the interfaces should have compatible attributes defined relative to the interface's methods. Compatibility consistency may be checked by a compiler and/or other static checking software 122.

With further attention to pointer parameters, in some embodiments, compatibilities can be specified for managed pointer types, which are also known as by-ref types. These types are exposed in C# by the ref keyword. For example, the method void M (ref int i) { i++; } takes a by-ref to an integer and increments that integer. This method M may be called with a variety of arguments; the by-ref might be a pointer to a static field, a field of a heap object, a field of a struct that itself is a field of a heap object, an element of an array, or a local variable of the caller, for example. Managed pointers can be restricted sufficiently so that all uses are type-safe. After usage constraints have been checked, for example, the Microsoft Common Language Runtime implementation of a method like M is fairly simple - the ref is just a pointer, and accesses to the variable are indirect via this pointer.

But an implementation 120 of transactional memory can make this situation less simple. Assume an implementation 120 uses object-based locking for heap objects. Object-based locking avoids the possibility of false sharing that other approaches may allow, and object-based locking enables compiler optimizations that would be less effective under a cache-line-based approach. However, object-based locking also means that different locations are locked differently. In particular, heap fields, static variables, and method local variables are transacted differently. Thus, if method M is annotated as AtomicSupported or AtomicRequired then the runtime needs some information about how to transact the access to the by-ref argument.

Note that by-ref values can flow from callers to callees. Recall the definition of method M above, but now assume that M has been annotated AtomicRequired, and consider the following method that calls M:

```
[AtomicNotSupported]

void Foo(ref int i) {
    Atomic.Do( ( )=> {M(ref i);} );
}
```

Foo is annotated as not supporting being called within an atomic block; a caller of Foo looking just at its declaration would have no reason to believe that the actual argument it provides for Foo's by-ref argument will be transacted. Indeed, Foo may be the implementation of an interface method annotated AtomicNotsupported; a caller of the interface method would have no reason to suspect that Foo might start a transaction internally. But M requires information to transact its by-ref argument.

In view of the foregoing issues regarding by-refs, in some embodiments the following rules apply. First, by-ref and pointer arguments have a transaction mode (a mode is one of AtomicSupported, AtomicNotSupported, or AtomicRequired), similarly to other language elements. By default, the transaction mode of by-ref and pointer parameters is that of the method; they are part of its signature. However, each parameter of by-ref or pointer type may also be explicitly annotated with a must-be, musn't-be or may-be annotation. In case pointer-to-pointer or any other multi-level of indirection parameter declarations are used (e.g., int***pppMyInt), each level of pointer indirection may have its own specific annotation associated with it.

When pointer or by-ref values are assigned to formal pointer or by-ref parameters of a method, the assignment must be compatible. The compatibility rules are similar to those that govern the compatibility of methods and delegate types. In other words, a pointer or by-ref value with an AtomicSupported contract may be assigned to pointer parameters with the AtomicSupported, AtomicNotSupported or AtomicRequired contracts. A pointer or by-ref value with the AtomicNotSupported contract may only be assigned to a pointer or by-ref parameter with an AtomicNotSupported contract. A pointer or by-ref value with an AtomicRequired contract may only be assigned to a pointer or by-ref parameter with an AtomicRequired contract. Additional contract(s) on parameters of pointer and by-ref types may be employed in order to guarantee that the address the pointer contains is that of a local variable, or that of immutable memory, or that of a static variable, or that of an object field, or that of an array element.

A by-ref or pointer argument may only be used in a transactional context that matches its transaction mode. Passing an input by-ref or pointer argument through to a called method counts as a use; the transactional context of the use is determined by the transaction mode of the formal argument in the called method.

In the example above, which assumed that method M was annotated as "[AtomicRequired]" (that is, must-be-in-transaction), the checking system would declare the Foo code illegal. Foo is annotated as "[AtomicNotSupported]" (must-not-be-in-transaction), so Foo's by-ref argument implicitly inherits this transaction mode attribute. Similarly, since M is annotated as "[AtomicRequired]" (must-be-in-transaction), M's by-ref argument implicitly has the same mode. The call to M thus passes a by-ref argument which is annotated as AtomicNotSupported (must-not-be-in-transaction) to a method expecting one annotated as AtomicRequired, which is illegal. A mechanism for making this legal is to separate the transaction mode of Foo's argument from that of the method:

```
[AtomicNotSupported]
    void Foo([AtomicSupported] ref int i) { ... }
```

Even though Foo cannot be called within a transaction, the argument annotation indicates that the argument might be passed into a transaction, and therefore calls to Foo would be augmented with information about the actual argument to which the ref argument points, and only a reference to a memory element with the [AtomicSupported] contract may be a supplied as the formal parameter 'i'.

The foregoing remarks also apply to method pointer arguments. Consider the following unsafe C# code:

```
[AtomicRequired] // must-be-in-transaction
    unsafe void MP(int * i) { (*i)++; }
[AtomicNotSupported]
    unsafe void FooIllegal(int * i) {
        atomic { MP(i); }
    }
[AtomicNotSupported] // must-not-be-in-
transaction
    unsafe void FooLegal([AtomicSupported] int * i)
{
    atomic { MP(i); }
}
```

FooLegal is legal, because it has annotated its pointer argument to indicate that it might be dereferenced in a transactional context. FooLegal produces an annotation-checking error, because the method's annotation determines the argument's default transactional mode, so the argument cannot be used in a transactional context.

Examples are provided above and elsewhere to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

Methods

Figure 3:
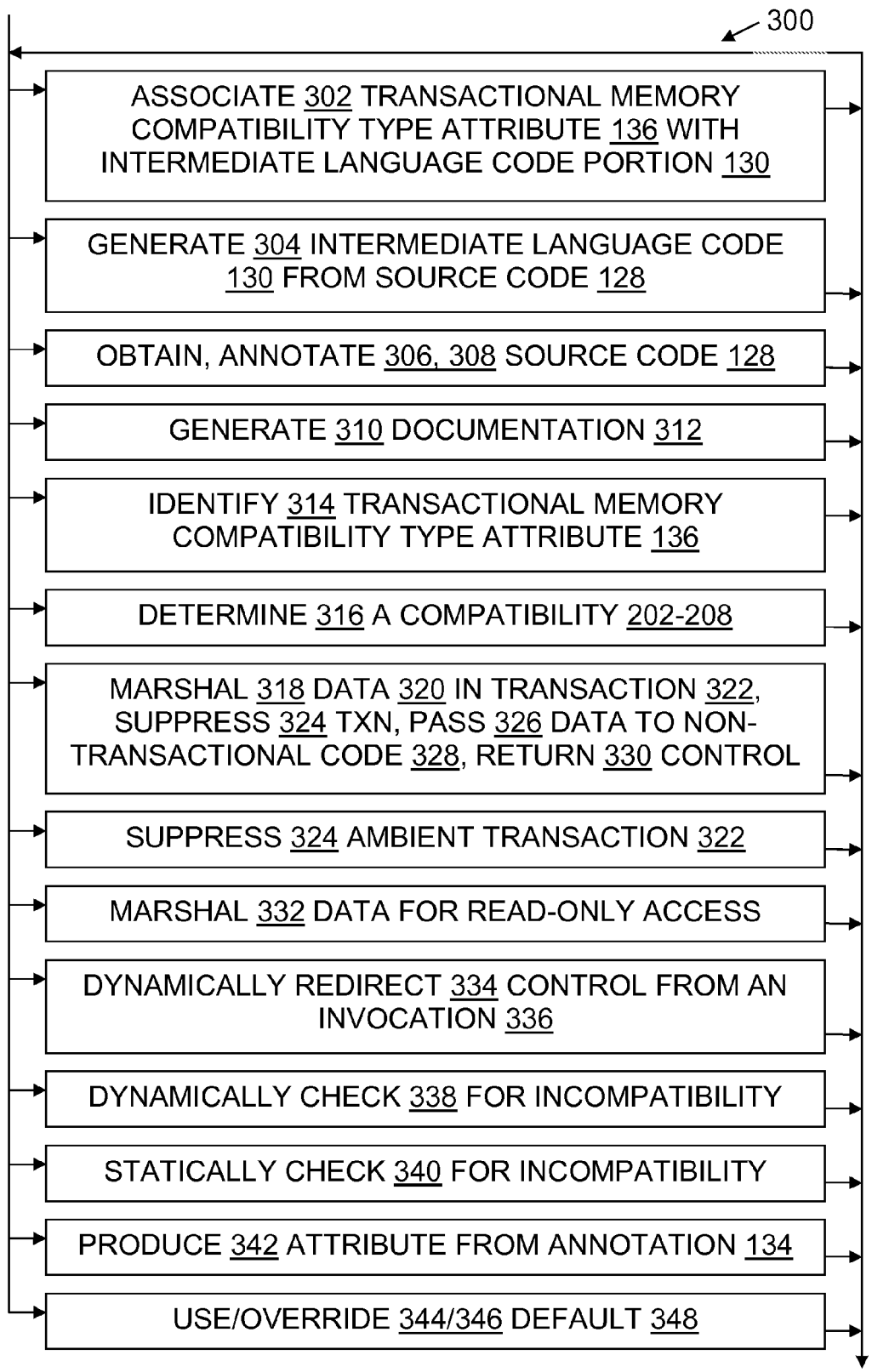
FIG. 3 is a flow chart illustrating steps of some method and configured storage medium embodiments.

FIG. 3 illustrates some method embodiments in a flowchart 300. Methods shown in the Figures may be performed in some embodiments automatically, e.g., by compatibility consistency checking software 122, or source code annotating tools under control of a script requiring little or no user input. Methods may also be performed in part automatically and in part manually unless otherwise indicated. In a given embodiment zero or more illustrated steps of a method may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

During an associating step 302, an embodiment associates a transactional memory compatibility type attribute 136 with an intermediate language code 130 portion. For example, an attribute may be linked by a pointer or other memory 112 addressing mechanism to intermediate code within a runtime 132 environment, such as a Microsoft NET runtime environment or a Novell Mono runtime environment.

During an intermediate code generating step 304, an embodiment generates intermediate language code 130 from corresponding source code 128.

During a source code obtaining step 306, an embodiment obtains source code 128. For example, source code may be obtained from a file, from a memory buffer, over a network link, or interactively from a user through a keyboard.

During a source code annotating step 308, an embodiment annotates source code 128 with at least one annotation 134 to indicate a transactional memory compatibility for the corresponding intermediate language code. In some embodiments, one or more of the following may be annotated: a method, a delegate type, a by-ref variable or method parameter or return value, a pointer variable or method parameter or return value, an interface method, a field, a virtual method, a struct, a function pointer.

During a documentation generating step 310, an embodiment generates documentation 312 from source code annotations 134. Documentation may include, for example, warnings of illegal or hazardous inconsistencies in transactional memory compatibilities specified by the annotations and/or by default rules.

During an identifying step 314, an embodiment identifies a transactional memory compatibility type attribute 136. Identification may be accomplished by parsing and reading a corresponding source code annotation, or by locating and reading a runtime attribute value, for example. Unless otherwise expressly indicated, the transactional memory compatibility type attribute 136 value is from a set of values which includes at least compatibilities 202, 204, and 206.

During a determining step 316, an embodiment determines a transactional memory compatibility 202-208. Compatibility determination may be based on identifying step 314, but may also include applying compatibility inheritance and/or default rules, e.g., inferred contracts.

During a marshaling step 318, an embodiment marshals data 320 such as method parameters. Marshaling may occur outside a transaction 322 (that is, outside an atomic region / atomic block) or marshaling may occur within a transaction 322. With regard to marshaling transacted objects, in some embodiments an atomic marshal attribute 136 may be placed on parameters. The atomic marshal attribute 136 signals to the compiler to make a deep copy of the parameter before passing it to the method. The copy may be prepared for read-only access or for read-and-write access. The atomic marshal attribute 136 may be particularly useful in combination with suppressed methods to marshal out transacted data. The following example illustrates a possible syntax:

```
[AttributeUsage(AttributeTargets.Parameter)]
public sealed class AtomicMarshalAttribute :
Attribute {
    public AtomicMarshalAttribute( );
}
```

During a transaction suppressing step 324, an embodiment suppresses transactional execution. That is, any transactional memory that would be used in the absence of the suppression is not used. In some embodiments, a suppress attribute 136 modifies execution by opting out the work of the associated method from the atomic block. This opted-out work will not be rolled back, the execution will be isolated from the original transaction, and any modification to data that is used by the original transaction may doom the transaction, or may be considered a race-condition, depending on whether the suppressed method correctly synchronizes the memory accesses that it performs. The suppress attribute may be used to integrate and support code that cannot be called within an atomic block, and may be used with dynamic redirection 334 (discussed below) to provide transaction support in some scenarios. One suitable definition is:

```
public enum ValidateOnEntry { Validate,
    DoNotValidate }
[AttributeUsage(AttributeTargets.Method)]
public sealed class AtomicSuppressAttribute : Attribute {
```

```
public AtomicSuppress ( );
public AtomicSuppress(ValidateOnEntry v);
}
```

During a data passing step 326, an embodiment passes data to other code. In particular, an embodiment may pass to non-transactional code 328 data that was marshaled within a transaction. The data may be marshaled in a read-only disposition or a read-and-write disposition. Some embodiments may be able to optimize the marshalling of read-only data as copying may not be necessary in those cases that the suppressed transaction hasn't previously modified the data.

During a returning step 330, an embodiment returns control to the next statement after the statement that passed 326 control to a method. Return values may be provided during returning step 330.

During a read-only marshaling step 332, an embodiment marshals data for read-only access. Marshaling step 332 may include marshaling step 318 plus additional measures to prevent (or at least detect) attempts to modify the marshaled data 320.

During a dynamic redirecting step 334, an embodiment dynamically (during execution) redirects control from an invocation 336 of one piece of code to give control instead to a different piece of code. Some embodiments dynamically redirect 334 control from an invocation 336 based on whether the invocation occurs within a transaction 322. In some embodiments, a redirect attribute 136 modifies an execution path if the annotated method is being called within an atomic block. The redirect attribute takes one required parameter which is the name of a method of the same type as the annotated method with the same signature as the annotated method and with an atomic contract of AtomicSupported or AtomicRequired. In the following example, if the annotated method is called within an atomic block then the method specified by the redirectedMethodName parameter is called instead.

```
[AttributeUsage(AttributeTargets.Method)]
public sealed class AtomicRedirectAttribute : Attribute {
public AtomicRedirect(String redirectedMethodName);
}
```

During a dynamic checking step 338, an embodiment checks a program dynamically (during execution) for inconsistency in expressed and/or default transactional memory compatibilities. Dynamic checking is discussed in detail later herein, not only for its own sake but also because such discussion helps illustrate the semantics of transactional memory compatibility type attributes 136 and other aspects of various embodiments.

During a static checking step 340, an embodiment checks statically (before/after program execution) for inconsistency in expressed and/or default transactional memory compatibilities of the program. Static checking is discussed in detail later herein, not only for its own sake but also because such discussion helps illustrate the semantics of transactional memory compatibility type attributes 136, thereby illuminating dynamic checking 338, documentation generation 310, compatibility determination 316, attribute production 342, annotations 134, and other aspects of various embodiments.

During an attribute producing step 342, an embodiment produces a transactional memory compatibility type attribute 136 from a source code annotation. The attribute is produced in a runtime format, such as a format used by a Microsoft NET runtime environment or a Novell Mono runtime environment.

During a default using step 344, an embodiment uses a default 348 rule for assigning transactional memory compatibility 202-208 to a piece of code, when no compatibility has been specified as a result of annotation. Default using step is also known as inferring a contract.

During a default overriding step 346, an embodiment recognizes that a programmer has expressly overridden a default 348.

Some embodiments provide a method for supporting transactional memory usage, including the step of automatically identifying 314 a transactional memory compatibility type attribute 136 which is associated in a computer memory 112 with a portion of intermediate language code 130, and determining 316 a compatibility between the intermediate language code portion and a transactional memory implementation 120 based on at least the attribute 136. Some embodiments include marshaling 318 data 320 in a transaction 322, passing 326 the data to non-transactional code 328 which runs with the transaction suppressed in response to the compatibility determining step 316, and then returning 330 control to the transaction from the non-transactional code. Some embodiments expressly suppress 324 an ambient transaction 322 in response to the compatibility determining step 316. Some marshal 332 data for read-only access in a transaction 322.

Dynamic Checking for Inconsistencies

Some embodiments include a checker 138 that uses the transactional memory compatibility attribute(s) to check 338 dynamically for incompatibility between the intermediate language code portion and the transactional memory implementation. Such incompatibilities may take the form of inconsistencies between the transactional memory semantics reflected in attributes 136 and the operations being attempted by intermediate language code 130.

In some embodiments, dynamic checking 338 is guided by the following general considerations. First, code pieces that cannot be correctly transacted by the transactional memory implementation 120 in a system should not be executed inside a transition. Second, a language element that requires a transactional context (e.g., code with a Required contract) should not be accessed outside a transaction. Third, a language element that requires a non-transactional context (e.g., code with a NotSupported contract) should not be accessed inside a transaction.

In some embodiments, the static check 340 is more conservative than the dynamic check 338 because a static analysis does not have dynamic information. For example, while checking function A(), some embodiments don't know whether A() will be called inside transactions or not. If A() calls B(), what kind of contract should B() have? That is, some embodiments may not have the actual execution context (namely, inside or outside a transaction) to check against at compile time. Therefore, some embodiments of a static checker 138 check 340 the compatibility of the contracts on callers and callees. In addition to checking the compatibility between callers and callees, a static checker may need to do much more work than a dynamic checker. For example, given a call site of a virtual call, the static checker generally cannot figure out which implementation version of this virtual method is actually invoked. What the static checker can do is to check the compatibility of the transactional context in which the call occurs (inferred from the caller's contract, or the enclosing atomic scopes, or the contract on the method invoked according to the static type of the virtual call target), and then separately check that contracts on overriding methods in subclasses are compatible with the contracts on the overridden method in the base class.

In summary, the strategy that the static checker takes in some embodiments is to do modularized checks, and to always check the compatibility among language elements. In some cases, the static checker 138 might report false alarms, since it is very conservative and checks all code paths, some of which may not be executed at all. In other cases, it is not feasible for the static checker to cover all cases since they are inherently dynamic, such as cases involving reflection or dynamic class loading. In some embodiments, a runtime checker 138 does dynamic checking 338 to perform at least some of the remaining compatibility analysis. In other embodiments the runtime checker does all of the remaining analysis.

In some embodiments, the strategy used by the dynamic checker is different from the static checker's strategy. At runtime, some embodiments have the actual execution context, and what those embodiments care about is whether the given code that is about to be executed should be executed in the current execution context. So instead of checking 340 the compatibility of contracts on callers and callees at the call sites, some embodiments check 338 whether the contract on the current method is appropriate in the current execution context when control flow enters this method, but before control flow executes the method code body proper. The runtime check thus addresses some uncertainty the static checker faces in virtual calls, reflection, and delegates.

Two basic checking strategies of the runtime checker are, firstly, to check 338 the contract of a managed method against the current execution context when entering the method and before executing the body of the method, and secondly, to check 338 the contract of a field against the current execution context just before accessing the field. Since in some embodiments the runtime checker does not always have all information it needs to make a compatibility decision, some situations receive special attention.

With regard to external calls that the runtime has no ability to analyze (e.g., Pinvokes and Fcalls in the case of Microsoft's NET framework), in some embodiments the runtime 132 won't compile such calls dynamically. Therefore, these embodiments won't be able to inject code at the beginning of such functions to do the runtime checking. Therefore, those embodiments may elect to check 338 the contracts of such external calls against the current execution context at call sites.

With regard to by-refs and pointers in some embodiments, if a by-ref or pointer is passed to a function then inside that function it is not always known what it points to, and therefore, those embodiments will not have the information to dynamically check the compatibility of referencing the given by-ref or pointer parameter. To address this situation, some embodiments carry the contract information with the by-ref or pointer. One way to carry that contract information is to annotate 308 the by-ref parameters with contract attributes 136. At call sites, embodiments check 338 the compatibility between the formal parameters and the actual parameters. Inside the callee, such embodiments check 338 the annotated contract of the parameters against the current execution context.

With regard to fields accessed through reflection, in some embodiments if a field is accessed through reflection, then the field access is embedded in the invocations of reflection APIs. Therefore, when the reflection API that affects field access is invoked, we dynamically check 338 the contract of the field against the current execution context within the reflection API.

Checker strictness level is a factor in some embodiments. The checking strategies determine when and how the checkers perform the checking 338, 340. Another issue is what to use as criteria for contract violations. In some embodiments both the static checker and the dynamic checker approaches described herein include best-effort checks 340, 338. That is, these approaches won't guarantee the precise set of all violations that break basic rules that a transactional memory implementation wants to follow, because doing so is not possible or deemed too expensive to achieve. Instead, the checkers implement their own particular definitions of contract violations, or approximate-contract-violations, thereby setting the strictness of the checkers. Other embodiments, on the other hand, may ensure that no violations are possible when the combination of static and runtime checking is used in tandem.

Some embodiments provide three different levels of strictness through checks 338 performed by a runtime checker: minimal, relaxed, and strict. Under a minimal strictness level, violations are defined as being in a transaction and attempting either code that is not transactable (e.g., no by-ref info, or language features not supported yet by an implementation 120) or code for native methods with no Required or Supported actual or inferred contracts. Under a relaxed strictness level, violations are defined as those under the minimal level plus violations due to being in a transaction when attempting NotSupported code or being outside a transaction when attempting Required code. Under a strict strictness level, violations are defined as those under the relaxed level plus violations due to being in a transaction when attempting RelaxedNotSupported code, namely, code that should not be accessed inside a transactional context unless the users want to experiment with it. The default strictness level is strict.

One reason to provide three strictness levels is to accommodate different user scenarios. Eventually, for products using a transactional memory system, a runtime checker should arguably run at the strict level to enforce basic semantic rules of the system as much as possible. But during the early adoption stage of the system, a programmer may want to experimentally run a program inside transactions to see what can be transitioned to transaction-safe code. A programmer may also have transitioned code to the transactional version, and marked them with appropriate contracts, but want to use a third party library which does not have any transactional memory compatibility contracts. The relaxed level allows the programmer to run the third party library but still have contracts on annotated code checked for inconsistencies.

As an example of a more lax checking style, a static checker could treat RelaxedNotSupported elements (code should not be accessed inside a transactional context unless the users want to experiment with it) the same way as NotSupported elements (should not be accessed inside a transactional context), even though these compatibilities have slightly different meanings, and the static checker could report violations if any element with either of these two contracts is accessed inside a transaction. A runtime checker, on the other hand, could provide more flexibility and handle these compatibilities differently according to the user's requirements. That is, what constitutes a compatibility violation is a decision made by the checker given the inferred contracts, the current execution context, and the strictness level with which the checker was configured to perform; these items in turn reflect decisions made by the checker's designer(s), implementer(s), administrator(s) and user(s).

In some cases detection of violations may not be critical but nonetheless helpful. For example, consider the possibility of misplacing a read-only marshaling 332 MarshallReadOnly attribute 136 on a non-reference parameter. At a given strictness level an embodiment may give a warning in response to the misplacement, or an embodiment may treat the misplacement as a normal violation (illegal). For instance, such misplacement could be considered a violation at the strict level, but not at other levels.

Another aspect of embodiments is how they report violations. After the runtime checker detects a violation, it may provide the user with information to assist in fixing underlying problem(s). An embodiment could throw an exception whenever it detects a transactional memory compatibility violation. But a programmer may want to run the program once, gather all error messages, fix them one by one, and then try again. Throwing exceptions on every violation could make the diagnostic process inconvenient. Therefore, some embodiments allow users to configure the runtime checker as to throw exceptions on violations, to log errors on violations, or to do both.

Based on the severity of violations, some embodiments divide all violations the runtime checker defines into three categories. Critical violations are violations defined for the minimal level of strictness. Contract violations are violations defined only for the relaxed level and the strict level. Warning-only violations are relatively harmless violations, such as placing a MarshallReadOnly attribute on non-refs. In some embodiments, detection of a critical violation always throws an exception, because such a violation may result in incorrect program execution or a system crash sooner or later. Warning-only violations do not throw exceptions. Therefore, the configuration of violation reporting only affects how the system reports contract violations.

Embodiments may log transactional memory compatibility violations in various ways. One alternative for logging is a Managed Debugging Assistant (MDA) or the like. MDAs are debugging aids that the Microsoft Common Language Runtime (CLR) environment provides to expose some information on runtime states, thereby helping diagnose hard-to-find bugs in a program. With MDAs enabled under a debugger, if an MDA event is fired the debugger will launch an exception dialog, highlight the problematic source code, and give the programmer a chance to break in. If an MDA event is fired without a debugging environment, a debugger launch dialog will pop up to give the user a chance to investigate. The behavior of an MDA, especially its usage in a debugging environment, sounds quite suitable for logging transactional memory compatibility violations. However, a motivation to choose logging over exceptions is to have all violations at once, like gathering compilation errors. Existing MDAs lack the flexibility of allowing users to configure whether to report all events at the end or report them on-the-fly one-by-one, so some embodiments add that violation gathering functionality to an MDA for logging transactional memory compatibility violations.

Another violation logging alternative involves Event Tracing for Windows (ETW). ETW is a general-purpose tracing infrastructure in the Microsoft Windows® operating system. Many Microsoft technologies, including the CLR, have been instrumented using ETW. ETW can be a powerful tool to understand and diagnose system behavior, but ETW is also relatively complex. Using ETW to log violations may be too complex if users only need a list of possible violations.

Another violation logging alternative is a tailored logging facility. In some embodiments, if users specify a log file then the system will log violation messages to the log file; otherwise, the system dumps error messages to the standard error output. This approach can be more lightweight and flexible than using MDA or ETW, but it may be at odds with the standard convention of a given runtime, e.g., the CLR environment.

With regard to configuring a runtime checker for dynamic checks 338, some embodiments provide four environment variables for users to configure the runtime checker. An STMRuntimeCheckLevel environment variable allows users to set the strictness level of the runtime checker 138 for dynamic checks 338; the allowed values for this variable are minimal, relaxed, or strict. An STMExceptionOnViolation environment variable allows users to have the runtime checker throw exceptions if a transactional memory contract violation is detected during dynamic checks 338 (other violations are not affected); allowed values are 0 (disable), 1 (enable). An STMLogOnViolation environment variable allows users to have the runtime checker log violations to a log file if the log file is specified, and to otherwise dump the log to the standard error output during dynamic checks 338 (this variable affects violations in all categories); allowed values are 0 (disable), 1 (enable). An STMViolationLogFile environment variable allows users to specify the log file to use when logging violations; allowed values are file names.

Some embodiments provide users with other options to configure the runtime checker. For example, a user may specify filters for the logging process so that they get a more focused report. Also, some embodiments support configuration of the runtime checker 138 via application configuration files. In addition, although the strictness level is a global setting in some embodiments, in other embodiments the runtime checker's strictness level can be set on a per-thread basis or even a per-transaction basis.

With regard to detailed implementation considerations for dynamic checks 338, in some embodiments a runtime checker 138 is part of the Microsoft CLR virtual machine and/or just-in-time compiler (JIT) software, and the time the runtime checker spends may be part of the program execution time. In other embodiments the IL that does the check is generated by the compiler or IL rewriter tools. Accordingly, tradeoffs may be made between the functionality the dynamic checker provides and the overhead it introduces.

As to JIT time violation checking 338, one way to implement violation checking is to insert barriers at the beginning of a method, and before a field access, to perform the violation checking while executing the program. Under this approach the checking is executed every time the code is executed, allowing more fine-grained control of the configuration of the runtime checker, such as the strictness level, the reporting style, etc., on a per-thread basis or even a per-transaction basis. However, this approach introduces significant overhead because it instruments every field access, most of which are not violations. Moreover, in order to make sure that "Required" elements are not accessed outside transactions, this approach would instrument non-transactional memory versions of code too, which slows down code that is not transaction-aware.

In some embodiments, JIT compilation is triggered at the first time the method is invoked in each kind of transactional context (inside-transaction or outside-transaction). Therefore, such embodiments know at JIT time what transactional context the method being compiled will be executed in. Based on the context, such embodiments can generate either the transactional or the non-transactional version of the code. Such embodiments may also have syntax markers for transactional scopes within the current method. Therefore, such embodiments know what transactional context each piece of code in the method will be executed in. Therefore, said embodiments can trade off some flexibility for performance. Some embodiments perform violation checking at JIT time, and insert a call to a violation report helper (e.g., a checker 138 in coordination with MDA or a custom logger) only if there is a violation. Such embodiments may still perform checking for "Required" contracts even when compiling non-transactional memory versions of code, but this checking is performed only during JIT time, not during program execution time. In addition, some optimization can further reduce the overhead. For example, if the current checking level is minimal, the embodiment may skip the checking process except for critical violations. Under this approach, an embodiment only pays for one extra conditional check during JIT time in this case.

Using a violation report helper, instead of generating corresponding violation report code in-place, simplifies intermediate language code generation (codegen) significantly. Using a violation report helper also leaves some flexibility to add more functionality without changing codegen. For example, an embodiment can still have some dynamic fine-grained control of the runtime checker, e.g., it may allow changing the violation reporting style even after the violation report helper code is inserted into the generated code. In addition, an embodiment can allow relaxing the strictness level dynamically. That is, if the strictness level is strict while the method is compiled, and it is a contract violation at the strict level to access the method in the current context, then while the violation report helper is executed an embodiment can determine whether the strictness level has been lowered and act accordingly. However, it is not possible for an embodiment to move from a less strict level to a more strict level, which is a price for reducing checking overhead, unless the code for the method is re-generated or patched, which is a viable possibility in some embodiments.

As noted previously, in some embodiments there are three kinds of violations: critical violations, contract violations, and warning-only violations. Both critical violations and warning-only violations happen only inside transactions. Therefore, an embodiment can check for these violations while it transforms code to utilize a transactional memory (TM) implementation 120, for example. Some critical violations (e.g. local pointer or by-ref variables without transaction compatibility info) may only be discovered during the process of compiling the code to run under transactions. Contract violations, however, could happen in both transactional and non-transactional contexts due to the "Required" contract. An embodiment could include a phase before TM transformation to check for these violations if the strictness level is higher than minimal (checking before the TM transformation phase to avoid missing some field access nodes that may be transformed away by the TM transformation phase). But for performance or other reasons, an embodiment may also piggyback on the TM transformation phase when doing checks that are related to the inside-transaction execution context, and on the morphing phase of the compiler for checks that are related to the outside-transaction context.

In one embodiment the control flow of a JIT compiler has the following sequence of steps and transformations: start with an intermediate language assembly; IL importation; inlining; TM transformation; code morphing; optimizations, register assignment, etc.; native code generation; JIT compilation process is now complete with native code that a computer can execute. Items between intermediate language assembly and native machine code are part of the JIT compilation. The items TM transformation and code morphing are phases related to the TM runtime checker. Both the TM transformation and code morphing share the same logic for contract checking, which is implemented in the algorithm of TMCheckContractViolation.

Figure 4:
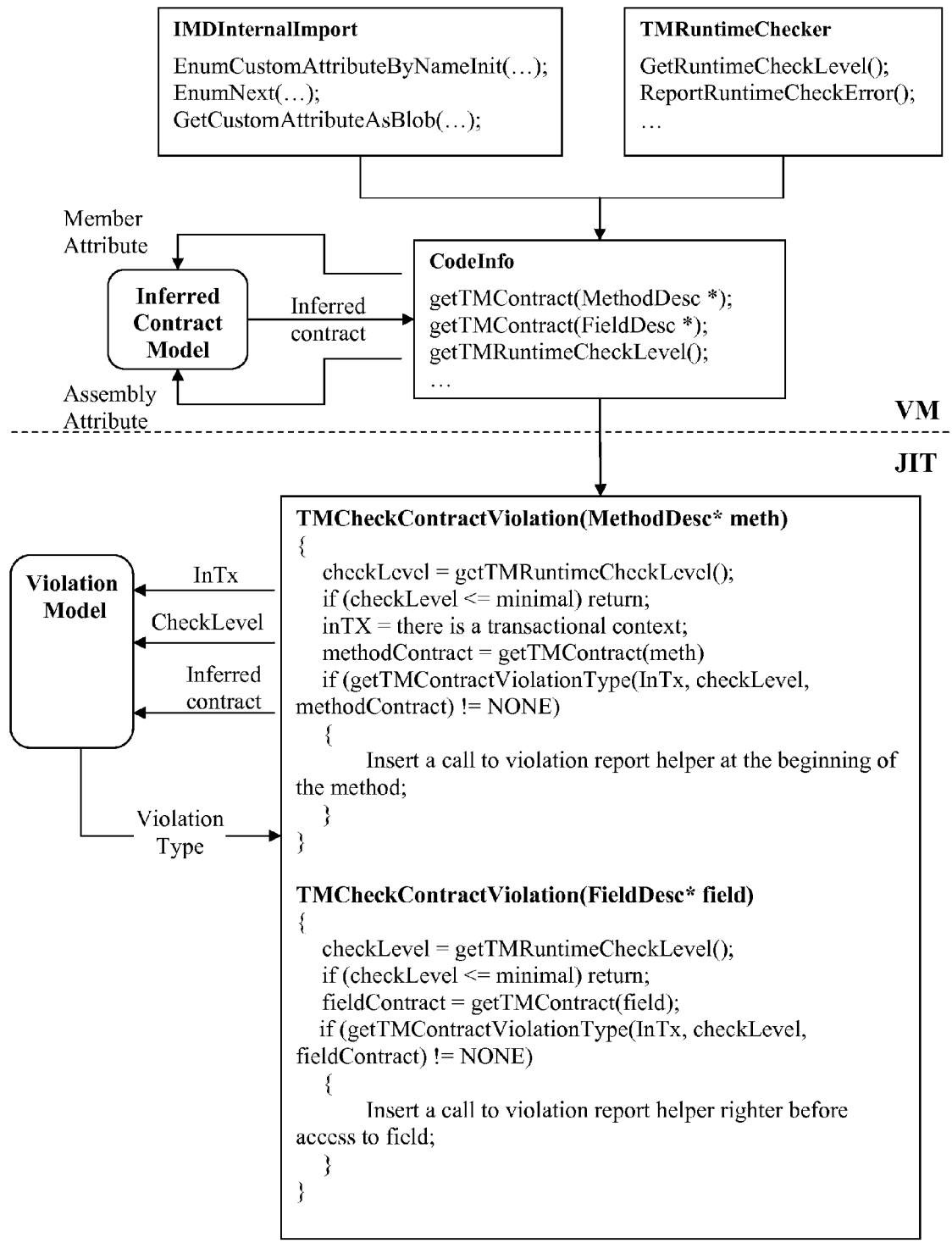
FIG. 4 is a flow chart illustrating steps of some embodiments for detecting inconsistencies in transactional memory usage.

FIG. 4 illustrates a particular embodiment's implementation of a process for checking contract violations (using TMCheckContractViolation). Approaches described herein can be used in the inferred contract model and the violation model shown in FIG. 4; inferred contracts have previously been referred to internally as logical contracts. JIT refers to the just-in-time compiler, and VM refers to the virtual machine that runs the intermediate language code on a particular native system. Conceptually, both the inferred contract model and the violation model are part of the TMRuntimeChecker, and each could be placed in the TMRuntimeChecker module for better encapsulation. However, to reduce the overhead of calling across the VM-JIT interfaces frequently, in this embodiment we embed the violation model in the JIT side. In addition, querying custom attributes is costly; to skip the query of the assembly attributes when there are explicit member attributes, we embed the inferred contract model in the contract query interfaces in CodeInfo.

With regard to runtime violation reporting, if the embodiment illustrated in FIG. 4 detects a violation at JIT time, it does not report the violation immediately, since it is possible the code that breaks the contract will not be executed due to conditional control flow. Instead, a call to the violation report helper is inserted at the beginning of the violating method or right before the violating field access, which will report the violation according to the report style configuration of the runtime checker, if invoked at runtime.

Inputs to the violation report helpers include the violation type, and several extra items of information that help construct an informative error message, such as the field or method description, parameter numbers, etc. The violation report helpers first gather fully qualified names for the callers, the callees, or the fields, and then pass them with the violation type to the violation reporting function TMRuntimeChecker::ReportRuntimeCheckError(). The ReportRuntimeCheckError() function first constructs a complete error message including the extra information passed in by the violation report JIT helpers. This method logs the error message to a file or standard error output if logging is enabled, and throws an AtomicContractViolationException if exception on violation is enabled (other exception and method names are possible in other embodiments).

An embodiment arguably should not report the violation if the transaction is inconsistent, so the embodiment would typically validate the transaction before doing any reporting. In this view, if the transaction is invalid the embodiment would roll it back. However, to simplify implementation, one embodiment first checks whether the current transaction is still consistent. If not, such an embodiment would skip logging and continue. The inconsistency of the transaction will be detected sooner or later, so the embodiment may not necessarily need to roll it back immediately, but also, such an embodiment doesn't report anything due to the inconsistent states of the transaction. We do still throw exceptions immediately if the transaction is not valid, since we will do validation and rollback when the TM system catches and handles exceptions thrown inside transactions.

Some embodiments only check contract violations for field accesses via direct field reference. The contract information is lost while we pass the reference to a by-ref or a pointer. Other embodiments annotate by-ref parameters with contract attributes, and do compatibility checks between formal and actual parameters at the call sites to handle by-refs cases. In some embodiments, field accesses via reflection are done by a set of special reflection functions. Contract checking code may be added to these reflection functions. The model of inferred contracts may be extended beyond the examples noted above. In particular, dynamic consistency checks 338 may be made for a variety of language elements, such as events, backing fields of automatic properties, anonymous methods, etc.

Static checking for Inconsistencies

Some embodiments use a source code annotation, which corresponds to the transactional memory compatibility attribute, to check 340 statically for incompatibility between the expected intermediate language code portion and the transactional memory implementation. In some embodiments, rules drive the static check 340 analysis of source code. Particular rules are discussed herein, with the understanding that different embodiments may use some of these rules, all of these rules, and/or some different rules, depending on factors such as which attributes 136 are implemented using annotations 134, which language portions may carry attributes 136, the allocation of checking between a static checker 138 and a dynamic checker 138 (neither, either, or both checkers may be present in a given system), and the availability of personnel and computing resources.

In some embodiments, assemblies can be either aware of transactions or unaware of transactions. Assemblies that are aware of transactions specify a default contract that is associated with all methods in the assembly. In one embodiment, methods without any explicit contract may be considered "Supported" (that is, may-be-in-transaction) in an assembly that is aware of transactions and that has its default contract attribute set to "Supported". Methods without any explicit contract will be considered "NotSupported" (must-not-be-in-transaction) in an assembly that is either unaware of transactions or that is aware of transactions and has its default attribute set to "NotSupported". In another embodiment, methods may simply be not checked unless explicitly specified.

Some embodiments perform static checking only on assemblies which are aware of transactional memory compatibility, e.g., which include annotation(s) 134 and/or attributes 136. Static checking may also be attempted on non-aware assemblies, and should not break derived non-aware assemblies, for example.

With regard to methods, we first consider rules for method invocation, and then we consider special cases for static constructors and finalizers. We then consider rules for parameters and return values.

As to invocation, in some embodiments a method can only be invoked in a transactional context that is compatible with its contract. Several contexts are used. When an atomic block is entered, the context is set to TX-Yes. When the atomic block is exited, the context is restored to whatever it was before entering the block. This is true regardless of how the block is encoded, e.g., whether the implementation uses a special try/catch clause as discussed elsewhere herein, or some other mechanism that specifies that a region of code operates with transactional memory. The system guarantees that the instruction(s) in TX-Yes context will always execute within an ambient transaction. When entering a method with the suppress attribute, the context is changed to TX-No. The system guarantees that the instruction(s) in a TX-No context will never execute within an ambient transaction. If the context is TX-Maybe, no guarantees are provided as to transactional execution, in other words, the code may be entered either inside or outside of transactions.

The contract (e.g., supported, not, required) determines the initial context assumed by the analysis, and atomic or suppress blocks can then modify the context. If the calling context transactional contract is TX-Yes (e.g., context is within an atomic block) then the called method's contract can properly be "Supported" or "Required"; otherwise the call is flagged illegal/not allowed. If the calling context transactional contract is TX-No then the called method's contract may be "Supported" or "NotSupported" at the call site. If the calling context transactional contract is TX-Maybe then the called method's contract may only be "Supported". Assume Method1 contains an atomic block, which calls Method2, which calls Method3. In some embodiments, Method2 is processed only once even though it may be called elsewhere, from outside atomic blocks. In some embodiments, methods like Method2 are processed twice: once with Tx-Yes when considering their use inside atomic blocks, and once with Tx-No when considering their use outside. In some embodiments, processing of Method1 does not inspect the body of Method2, except in the case of compiler-generated-private-methods.

For virtual calls, part of a compiler or a separate static checking tool, for instance, or a similar checker 138 checks 340 the contract on the method determined by the static type of the receiver object. In the example below, to determine the contract on d.Foo() the static checker looks at the contract specified for Derived.Foo() and not at the contract for Base.Foo(). However, when determining the contract on b.Foo(), the static checker looks at the contract specified for Base.Foo().

```
class Base
{
    public virtual void Foo( ) { }
}
class Derived : Base
{
    public override void Foo( ) { }
}
class G
{
    void g( )
    {
        Base b = new Derived( );
        Derived d = new Derived( );
        b.Foo( );
        d.Foo( );
    }
}
```

As to static constructors, in some embodiments static constructors cannot be called inside a transaction; therefore static constructors can be only be annotated with the "NotSupported" contract. Even when no contract is placed on static constructors, their contract defaults to "NotSupported", regardless of the default contract for the assembly. Static checking 340 will only report an error if the programmer explicitly places a "Required" or "Supported" contract on a static constructor. Since static constructors are NotSupported (must-not-be-in-transaction), their method invocation and field access rules cannot be overridden by AtomicRequired (must-be-in-transaction), by AtomicSupported (may-be-in-transaction) or by indeterminate compatibility.

As to instance constructors and read-only fields, in some embodiments instance constructors should access fields in the correct transactional context. Since, in some environments, such as in the C# language and the .NET Framework, instance fields initialized in their declaration are prepended to the code of the instance constructor, the initial transactional context of the constructor (determined by its contract) should be compatible with the contract of the instance field in question. This does not apply to static constructors; unlike instance constructors which could directly or indirectly publish the "this" pointer and so be vulnerable to races, static constructors can be invoked only once per appdomain and at the time of their execution, no other thread has access to the static fields of the class. Thus, no further isolation needs to be provided by the transactional system. An exception to the above rules is present with read-only fields. Since read-only fields cannot be modified once they are initialized, it is legal for the instance constructor to access the read-only field in an incompatible context.

As to instance finalizers, in some embodiments finalizers can be called only by a distinguished finalizer thread, so they always need to support being called in a non-transactional context. Such finalizers cannot properly be annotated with the "Required" contract; they only support either the "Supported" or the "NotSupported" contracts.

As to parameters and return values, in some embodiments, contracts can be placed on ref or pointer parameters and ref or pointer return values. If no contracts are specified, then their contract defaults to the contract of the method. Pointers and by-refs are discussed in greater detail elsewhere herein.

Some embodiments provide certain implementation attributes 136 on methods, indicated by annotations 134. For example, dynamically redirecting 334 control may occur in response to a redirect attribute 136. When the redirect attribute is placed on a method, the default contract associated with it is Supported. However, both the Supported and Required contracts are compatible with the redirect attribute so either contract can be placed in conjunction with redirect. Placing redirect on a method tells the runtime to invoke another method (the target of the redirect attribute) when this method is encountered inside an ambient transaction. This redirection mechanism can be used to add transaction compliant versions of NotSupported methods, by redirecting execution to the transaction compliant code.

In some embodiments, the static checking 340 rules for redirect use include the following. First, redirect is not compatible with the NotSupported contract so placing these two attributes on the same method is not allowed. Second, redirect cannot be placed on static or instance constructors. Third, the source and target of a redirect should have the same signature, namely, at least the same return type, parameter types, generic parameters with their respective restrictions, and the same serializability. Fourth, to reduce complexity, the target of a redirect should not itself redirect to another method. The parameters of a target method may have additional marshalling attributes as described earlier.

Suppressing 324 a transaction may occur in response to a suppress attribute 136. Placing the suppress attribute on a method (e.g., by an annotation 134) tells the runtime to change the context to TX-No when this method is invoked. When the method returns, the runtime restores the context to what it was prior to invoking this method. In some embodiments, when the suppress attribute is placed on a method the default contract associated with the method is "Supported". Both the "Supported" and "Required" contracts are compatible with the suppress attribute so either one of them can be placed in conjunction with suppress. However, in some embodiments the "NotSupported" contract is incompatible with suppress; placing it on a method with the suppress attribute will result in a static checking error. Redirect interaction with delegates may differ in different embodiments. Redirection may be followed when creating the delegate, or when calling through it, for example, provided the redirection takes place when, and each time, the delegate is invoked. In one configuration, the redirect is implemented as "jump" in the redirected method, so the redirection is followed on invocation.

In some embodiments, fields can have contracts associated with them which specify the transactional context in which the field can be accessed. This places restrictions on field accesses. The rules for field access to class members can be the same as for method invocation; struct fields are discussed elsewhere herein. Exceptions to field access rules include fields with the const or read-only modifiers. Accessing such fields in an incompatible context is considered safe and does not lead to a static checking error.

Of course, static checks are not generally guaranteed to identify all problematic situations, so special cases may exist in which code (source or intermediate language) passes static checking but is nonetheless inconsistent with regard to transactional memory accesses. To identify such special cases, one may consider various cases of state access, e.g., accessing formal parameters (consider normal and by-ref); accessing member fields through 'this' and 'base' (for non-static methods); accessing symbols of enclosing scope and statics. One may also consider a const/readonly field (marked NotSupported) which points to NotSupported data; dereferencing and using such a field inside a TX-Yes or TX-Maybe context could be flagged as an error during static checking 340.

With regard to delegate binding, in some embodiments, contracts can be placed only on type members and not on types themselves, with the exception of delegate types. Some embodiments allow placing contracts on a delegate type. Since the contract on a delegate type specifies the transactional context in which instances of that type will be called this places a constraint on the contract(s) allowed for methods that can be assigned to delegates. If the delegate type contract is Supported then the methods should be Supported; otherwise static checking 340 reports an error. If the delegate type contract is NotSupported then the methods should be Supported or NotSupported. If the delegate type contract is Required then the methods should be Supported or Required. If the delegate type contract is indeterminate (unchecked) then the methods may be Supported, NotSupported, or Required. In some embodiments, the Unchecked contract can be placed only on delegate types. An instance of an Unchecked delegate type can be called in any transactional context. As a special case for the method invocation rules discussed above, when the static checking tool encounters a delegate invocation inside a method, it looks at the contract specified on the delegate type instead of the contract specified on the methods assigned to that type.

Consider the case of a delegate that is to be assigned only within a transaction. For instance, suppose the delegate is updated in multiple threads and run on one thread; a programmer might want to limit access to the delegate type to occur within a transaction only (Required). Some embodiments check two sets of rules when doing delegate assignment. First, the contract on the delegate type (D in the example below) should be compatible with the contract on the method (foo) bound to it, as just discussed. Second, field access rules discussed earlier are used in situations such as when an instance of a delegate type will be written to in another method, e.g., used to check the compatibility of Bar and _d in the following example:

```
Delegate D;
Class
{
    D _d;
    Bar( )
    {
```

```
        _d = new D (foo);
    }
}
```

With regard to virtual methods and interfaces, in some embodiments virtual methods of a base class or interface methods might have a contract specified on them. This places restrictions on the transactional context within which these methods and the methods that override (implement) them may be called. This in turn places a restriction on the contract that can be placed on the overriding (implementing) methods. If the contract of the base/interface method is Supported then only the Supported contract should be placed on overriding (implementing) methods; otherwise a static checking error is reported. If the contract of the base/interface method is Not-Supported then the Supported contract or the NotSupported contract should be placed on overriding methods. If the contract of the base/interface method is Required then the Supported contract or the Required contract should be placed on overriding methods. If the contract on the base/interface method is Unchecked, then Supported, Required or NotSupported can be placed on the overriding/implementing methods.

With regard to properties and indexers, in some embodiments a transactional memory system does not support placing contracts on properties or indexers but does support placing contracts on their get and set accessors. These accessors are methods and are subject to the compatibility rules noted earlier for method invocation. Additionally, any fields accessed inside the accessors, including the backing field for the property, are subject to the field access rules specified earlier.

With regard to auto-implemented properties, in some embodiments auto-implemented properties are used to make property declaration and implementation more concise when no additional logic is required in the property accessors. The compiler creates a private backing field for auto-implemented properties that can only be accessed through the property's accessors. In some programming environments, such as in the C# programming language, programmers can add attributes on the get and set accessors for an auto-implemented property, but not on the backing field. For static checking, an embodiment may implicitly infer the contract on a backing field to be "Supported", even in non-aware assemblies, so that specifying contracts on the accessors is considered sufficient when using auto-implemented properties.

With regard to anonymous methods and closures, in some embodiments anonymous methods are generated by the compiler when it encounters an anonymous method declaration (for example, using the 'delegate() { . . . } syntax in C#) or a lambda expression. The compiler either generates a simple private method in the same class or a closure class based on whether local variable capture is required. A C# programmer cannot explicitly specify contracts for both these constructs since C# does not support placing attributes on them. In some embodiments, the contract for such compiler generated methods is inferred from the contract of the delegate type to which they are assigned, that is, the contract placed on the delegate type is considered to be the contract for the compiler generated method. If the contract on a delegate type (to which the compiler generated method is assigned) is Unchecked then the compiler generated method takes its contract from somewhere else, e.g. the assembly default.

In other embodiments, the contract of private compiler generated methods (PCGMs) is being deduced by the actions that they invoke in their body. In such systems, it is possible that a PCGM method invokes another PCGM. It's even possible that PCGMs invoke each other recursively. In order to infer the contract of all PCGM in a program, an iterative algorithm is used. The algorithm works in phases. In the first phase it is assume that all PCGM have a contract of Atomic-Supported. Then all PCGM are processed. When processing a PCGM we note the compatibility of elements (fields, methods, delegates, etc.) that are accessed within the PCGM. There are four cases.

In the first case, the PCGM accesses only AtomicSupported elements. In this case the PCGM inferred contract remains AtomicSupported.

In the second case, the PCGM accesses only AtomicNotSupported elements and potentially also AtomicSupported elements. In this case the PCGM contract is changed to AtomicNotSupported.

In the third case, the PCGM accesses only AtomicRequired elements and potentially also AtomicSupported elements. In this case the PCGM contract is changed to AtomicRequired.

In the fourth and final case the PCGM is accessing at least one element that has the AtomicRequired contract and at least one, different, element with the AtomicNotSupported contract. In this case no assignment of contract to the PCGM would be consistent and the algorithm terminates with an error.

After processing all PCGMs thusly the algorithm determines whether the contract of any of the PCGMs has changed. If not, then the algorithm has converged and no additional phase of processing is required. Otherwise, another phase of processing is applied to all PCGMs.

Whenever an embodiments contains an inference algorithm for PCGMs that is applied by the static checker a similar type of logic may be required by the dynamic checker. In some embodiments, the exact inference algorithm is applied by both checkers. However, this algorithm may be expensive or impractical to execute in the context of a dynamic checker and therefore some embodiments of the dynamic checker may elect to simply skip some of the tests that are associated with PCGMs. In particular, the test which ensures that the method is called within a context it supports may be elided in such embodiments, in the case of PCGMs.

Some different embodiments incorporate the inference algorithm into the language compiler, such as the C# language compiler, and after the inference algorithm is complete they generate the correct attributes on the PCGMs. In such systems, the dynamic checker doesn't have to treat PCGMs differently from any other method.

In some embodiments structs are treated like primitive types, in that struct types and their member fields cannot be annotated 308. Struct method annotations may, however, be allowed. In order for struct methods to access struct fields some embodiments assume that all struct fields have a contract of Supported.

With regard to pointers and by-refs, some embodiments provide checking 340 in part by performing a by-ref information analysis that statically computes information about the targets to which by-ref and pointer values may point. In some embodiments this by-ref information analysis may take the form of flow analysis. For example, this analysis determines the actual argument provided by a caller for a ref formal parameter, augmenting the call with information about the actual argument. Some embodiments always do this, while other embodiments only do this for ref or pointer arguments that do not have a NotSupported annotation. While the C# language only allows by-ref values via the ref notation at method boundaries, the Microsoft NET intermediate language is more liberal, so the C# compiler may create locals of by-ref types. Thus, by-refs are approximately as complicated as pointers, which may flow freely between locals.

The by-ref information analysis tracks the flow of by-ref and pointer values. These values are created by being the value held in an input argument, by being the return value of a method, or by being the result of an operation that takes the address of a location, or by loading a pointer value that is stored in an object field, an array element or a static variable.

After a by-ref/pointer value is created, the analysis tracks its flow. The analysis is conservative; it may at some points give up and declare that it can track no information about the value that a local contains. For example, such an analysis tracking termination might occur with a code pattern like the following:

```
static int s_i;
class Foo { public int m_i; }
void M(Foo f, int k) {
    int * ip;
    fixed (int * ip_s = &s_i)
        fixed (int * ip_m = &f.m_i)
            if (k > 5) { ip = ip_m; }
            else { ip = ip_s; };
    // XXX
}
```

At program point XXX, the variable ip may contain either the address of the static s_i or of the field m_i in the object to which f refers, depending on the dynamic value of k. The static analysis does not represent alternative outcomes like this; instead, when it has to merge the two possible values of ip after the if statement, it gives up and assigns ip a "top" abstract value, indicating that it has no information about the actual value. In some embodiments static checking may determine the value that ip points to by doing whole program analysis.

Two more ways in which "top" pointers can be created are by a by-ref or pointer return value from a method call, or by reading a pointer value from a heap object, array element or static field. In each case, some embodiments may allow a programmer to avoid the problem. Examples of such embodiments are:

a. A method annotation 134 [return: AtomicSupported] causes a method with a by-ref or pointer return value to also return information about that return value.

b. When information is required for a pointer stored in a non-heap location that location can be declared to be a special pointer-type, which causes additional information determined by the static analysis to be bundled dynamically with the pointer.

There is another way in which a "top" pointer value may be created. The by-ref information in some embodiments is one-level deep, e.g., there is no way of saying that a variable of type "int**" contains "a pointer to a pointer to a field of a heap object." Thus, if one creates a pointer to a local variable that is itself of a pointer type, and does something that may write through the pointer, then the pointer local variable whose address was taken is assumed to contain "top." The outer pointer may be either an unmanaged or managed pointer. Thus, if we have:

```
unsafe void M2(ref int * ipp)  { ... }
unsafe void M(Foo f)  {
```

-continued

```
fixed (int * ip = &f.m_k)  {
    M2(ref ip);
    // What do we know about what "ip"
    points to?
    }
}
```

Some embodiments assume that the answer to the question posed above about ip is "nothing at this time", since the answer depends on what M2 does dynamically to its argument, and the by-ref information system only handles one level of indirection. More generally, some embodiments assume that whenever one creates a pointer to a local variable of a pointer type, one immediately loses information about the target of that local.

On the other hand, in other embodiments it is possible to annotate each additional level of indirection with the desired compatibility contract and any other assertions regarding the nature of the memory pointed-to by the by-ref or pointer variable.

In some embodiments, annotation checking is related to the by-ref information analysis because the analysis determines what is known about pointer values when they are used. In a language designed from scratch with the needs of annotation checking 340 in mind, one could generally augment pointer types with transaction modes, so that transaction modes of local variables of pointer types could be specified. Then the need to do a flow analysis of pointers would be reduced or eliminated; one could just check at each assignment to a local that the right-hand-side value was compatible with the mode of the local. The local variable annotations would also indicate when it is required to represent the static information dynamically, e.g., if we changed the previously-mentioned example to:

```
[AtomicSupported] int * ip;
    fixed (int * ip_S = &s_i)
        fixed (int * ip_m = &f.m_i)
            if (k > 5) { ip = ip_m; }
            else { ip = ip_s; };
// XXX
```

This revision would now indicate to the compiler that it would need to generate code to dynamically track information about the target of the pointer "ip."

An embodiment that does not recognize annotation 308 of local variable declarations but does allow one to annotate 308 method parameters can utilize the flow analysis discussed herein for static checks 340. The flow analysis would be able to track the value that the local pointer or by-ref variable points to and would then use this information to infer the contract (or transactional mode) of the said pointer or by-ref variable based on the contract of the value to which it points, In particular, the abstract values used for static by-ref information in the analysis can indicate how to transact an access via the by-ref or pointer. An embodiment may implement such a flow analysis approach using the following three-step approach:

First, all NotSupported pointer values are supported as "top". One has no information about them, but won't need to transact them.

Second, within the static analysis, other values are augmented with an indication of whether they are Supported or Required. A value is now a pair <mode, value>, where mode is one of the two modes, and value is an instance of the abstract value currently used in the analysis. These pairs merge element-wise, merging the value components according to rules for the current abstract value type of the analysis, and merging the modes as follows:

```
Mode ModeMerge(Mode m1, Mode m2) {
    if (m1 == Supported and m2 == Supported) then
return Supported
        else return Required
}
```

Third, we determine how to initialize our new abstract value pair type when analyzing constructs that create pointers, such as taking the address of a location. In particular, the mode of the pointer value produced by taking the address of a location depends on properties of the location; the mode of the address of a field depends on the mode of the field. Taking the address of a NotSupported field yields top; taking the address of Supported or Required fields yields abstract pointer values with the corresponding mode. The rules for field modes are obeyed, even when fields are accessed via pointers. Similar rules apply to operations that create managed by-ref pointers.

Now the static analysis will determine one of these pairs for each local variable at each program point. If the static analysis determines that the mode inferred for a local variable does not match the mode in which it is used, then it would generate an error message. Two examples of this type of checking for pointer or by-ref variable use are:

a. Dereferencing a pointer. In this case the mode of the pointer should match the mode of the transactional execution context, in which this dereference occurs.

b. Passing an argument to a method. In this case the mode of the pointer or by-ref passed as an argument should match the mode of the formal parameter.

Configured Media

Some embodiments include a configured computer-readable storage medium 114, which is an example of a memory 112. Memory 112 may include disks (magnetic, optical, or otherwise), RAM, EEPROMS or other ROMs, and/or other configurable memory. The storage medium which is configured may be in particular a removable storage medium 114 such as a CD, DVD, or flash memory. A general-purpose memory 112, which may be removable or not, and may be volatile or not, can be configured into an embodiment using items such as static analysis and/or dynamic analysis checkers 138, annotations 134, attributes 136, and software 122 for generating annotations/attributes, in the form of data 118 and instructions 116, read from a removable medium 114 and/or another source such as a network connection, to form a configured medium. The configured memory 112 is capable of causing a computer system to perform method steps for supporting transactional memory implementation(s) 120 as disclosed herein. FIGS. 1 through 3 thus help illustrate configured storage media embodiments and method embodiments, as well as system and method embodiments. In particular, any of the method steps illustrated in FIG. 3, or otherwise taught herein, may be used to help configure a storage medium to form a configured medium embodiment.

Some embodiments provide a computer-readable medium 114 configured with data 118 and instructions 116 for performing a method for assigning transactional memory compatibilities such as compatibilities 202-208. The method includes obtaining 306 source code 128 for a software component such as a package, an assembly, an application program, or a library, and annotating 308 at least a portion of the software component source code with transactional memory compatibility annotations 134. For instance, the method may annotate a delegate, a by-ref, an interface, a field, a virtual method, a function pointer, and/or other code. The annotations are selected from a group of annotations which includes annotations for at least the following compatibilities: must-be-in-transaction compatibility 202, must-not-be-in-transaction compatibility 204, and may-be-in-transaction compatibility 206.

In some embodiments, the method also includes producing 342 transactional memory compatibility attributes 136 from the annotations while generating 304 an intermediate language code 130 from the source code 128. The intermediate language code may be runnable in a Microsoft NET runtime environment and/or a Mono runtime environment, for example. In particular, the method may produce transactional memory compatibility attributes which collectively specify for the entire software component one or more compatibilities between the software component and a transactional memory implementation. In some embodiments, the method produces transactional memory compatibility attributes not only in response to the annotations, but also based on a default 348 rule for non-annotated source code of the software component, e.g., using inferred contracts. In some cases, the method includes overriding 346 a default transactional memory compatibility by an express compatibility specified in an annotation. In some embodiments, the method assigns a kernel call or another unsafe call a must-not-be-in-transaction compatibility, based on a default rule.

Additional Examples

Some embodiments discussed herein provide or at least facilitate the following characteristics: a transactional memory programming model that will allow minimal to no changes made to the compiler front end, no changes to existing intermediate language code semantics, implementation of a runtime that will be able to run legacy code alongside new code using transactional memory, and use of inherently compatible legacy code after recompilation. For example, annotations 134 may be implemented without significant changes to a compiler front end. Likewise, attributes 136 may be implemented without changing the semantics of existing intermediate code or rewriting virtual machines.

In some embodiments, the foregoing characteristics arise in part from modifying the runtime to recognize atomic blocks of code by leveraging an existing try/catch construct, and creating an object which provides methods that take delegates, lambdas, or function pointers as parameters. These methods execute the parameter within a try/catch block with the atomic marker.

The try/catch mechanism may be combined with other mechanisms discussed herein, such as annotations 134 used to designate methods as compatible with transactional memory. Tools such as compilers and utility software 122 may also be provided to parse source code or intermediate language code and may include software to check 340 for uses of code within a transactional memory operation that may not be compatible. Some embodiments make appropriate default assumptions about the implicit annotation of legacy code. Some embodiments detect through dynamic checks 338 the use of incompatible actions while executing within a transactional memory block.

As an example of the try/catch mechanism, consider the following code; the names of these classes and methods are merely examples:

```
static class Tm
{
    public delegate void uow( );
    public static void atomic(uow UnitOfWork)
    {
        try
        {
            UnitOfWork( );
        }
        catch (AtomicMarker) { }
    }
}
```

When using the above class the user would write their program in C# along the following line:

```
class myClass
{
    public static void myTransfer(AccountClass a,
            AccountClass b,
                int amount)
    {
        Tm.atomic(( ) =>
        {
            b.credit(amount);
            a.debit(amount);
        });
    }
}
```

In this example, arbitrary accounts are handed to a method which then transfers the amount from one account to another. The credit and debit methods may throw an exception, e.g., if a debit would result in a negative balance, and then nothing would be added to account "b". If the method completed successfully then both accounts will reflect their new balances at the same time.

The transactional memory subsystem guarantees that if two transactions were accessing the same information at the same time then no race condition will exist between the two transactions. So in the previous example, if at the same time a transfer was called by multiple execution threads using the same accounts, the execution of the multiple threads would appear to complete as if they were executed in serial fashion.

Conclusion

Although particular embodiments are expressly illustrated and described herein as methods, as configured media, or as systems, it will be appreciated that discussion of one type of embodiment also generally extends to other embodiment types. For instance, the descriptions of methods in connection with FIGS. 3 and 4 also help describe configured media, and help describe the operation of systems and manufactures like those discussed in connection with FIGS. 1 and 2. It does not follow that limitations from one embodiment are necessarily read into another. In particular, methods are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A computer system configured for transactional memory support, the system comprising:
    a memory;
    a logical processor in operable communication with the memory;
    source code configuring the memory;
    a transactional memory compatibility type annotation associated in the memory with a portion of the source code, the annotation being part of a contract which defines expected and acceptable behavior of executable instructions with regard to transactional memory usage;
    intermediate language code configuring the memory and generated at least in part from the source code, the intermediate language code including code which is intermediate between programming language source code and a particular hardware instruction set; and
    a transactional memory compatibility type attribute associated in the memory with a portion of the intermediate language code and specified in the source code by the annotation, the transactional memory compatibility type attribute specifying a compatibility between the intermediate language code portions and a transactional memory implementation.

2. The system of claim 1, wherein the transactional memory compatibility type attribute is associated in the memory with intermediate language code for at least one of the following: a delegate type, a by-ref variable or method parameter, a pointer variable or method parameter, an interface method, a field, a virtual method, a function pointer.

3. The system of claim 1, wherein the memory is further configured by a program designed to use transactional memory compatibility source code annotations to automatically generate documentation.

4. A method for supporting transactional memory usage, comprising the steps of automatically:
  identifying a transactional memory compatibility type attribute which is associated in a computer memory by a source code annotation with a portion of intermediate language code, the source code annotation characterized in at least one of the following ways:
    the annotation specifies which methods or functions must be run within a transaction;
    the annotation specifies which methods or functions may be run within a transaction:
    the annotation specifies which methods or functions must never be run within a transaction;
    the annotation specifies that a transaction should be suppressed;
    the annotation indicates that a runtime should encase code within a transaction;
    the annotation provides methods which take function pointers, lambdas or delegates to run within a transaction;
    the annotation specifies objects or fields that must be used in a transaction; and
  with the transactional memory compatibility type attribute, determining a compatibility between the intermediate language code portion and a transactional memory implementation.

5. The method of claim 4, further comprising marshaling data in a transaction, passing the data to non-transactional code which runs with the transaction suppressed in response to the compatibility determining step, and then returning control to the transaction from the non-transactional code.

6. The method of claim 4, further comprising expressly suppressing an ambient transaction in response to the compatibility determining step.

7. The method of claim 4, further comprising marshaling data for read-only access or for read-and-write access in a suppress region.

8. The method of claim 4, further comprising dynamically redirecting control from an invocation based on whether the invocation occurs within a transaction.

9. The method of claim 4, further comprising using the transactional memory compatibility attribute to check dynamically for incompatibility between the intermediate language code portion and the transactional memory implementation.

10. The method of claim 4, further comprising using a source code annotation which corresponds to the transactional memory compatibility attribute to check statically for incompatibility between the intermediate language code portion and the transactional memory implementation.

11. The method of claim 4, further comprising at least one of:
  inferring a contract of a private compiler generated method from action(s) invoked in the private compiler generated method;
  inferring a contract of a pointer from a property of data the pointer points to;
  inferring a contract of a pointer from a property of a memory location the pointer points to;
  inferring a contract of a by-ref from a property of data the by-ref points to;
  inferring a contract of a by-ref from a property of a memory location the by-ref points to.

12. A computer-readable storage medium configured with data and instructions for performing a method for assigning transactional memory compatibilities, the method comprising the steps of:
  obtaining source code for a software component;
  annotating at least a portion of the software component source code with transactional memory compatibility annotations, the annotations defining expected and acceptable behavior of executable instructions with regard to transactional memory usage, the annotations selected from a group of annotations which includes at least the following: must-be-in-transaction, must-not-be-in-transaction, and may-be-in-transaction; and
  producing transactional memory compatibility attributes from the annotations while creating an intermediate language code from the source code.

13. The configured medium of claim 12, wherein the method produces transactional memory compatibility attributes which collectively specify for the entire software component one or more compatibilities between the software component and a transactional memory implementation.

14. The configured medium of claim 13, wherein the software component for which transactional memory compatibility is entirely specified includes at least one of the following: a package, an assembly, an application program.

15. The configured medium of claim 12, wherein the method produces transactional memory compatibility attributes in response to the annotations, and wherein the method further provides a transactional memory compatibility attribute in the intermediate language code for a non-annotated source code of the software component, based on a default rule.

16. The configured medium of claim 15, wherein the method further comprises overriding a default transactional memory compatibility by an express compatibility specified in an annotation.

17. The configured medium of claim 15, wherein the method comprises assigning an unsafe call a must-not-be-in-transaction compatibility, based on a default rule.

18. The configured medium of claim 12, wherein the annotating step annotates at least two of the following with transactional memory compatibility annotations: a method, a delegate type, a by-ref variable or method parameter or return value, a pointer variable or method parameter or return value, an interface method, a field, a virtual method, a struct, a function pointer.

19. The configured medium of claim 12, wherein
  at least one of the source code annotations is characterized in at least one of the following ways:
    the annotation specifies which methods or functions must be run within a transaction:
    the annotation specifies which methods or functions may be run within a transaction;
    the annotation specifies which methods or functions must never be run within a transaction:
    the annotation specifies that a transaction should be suppressed;
    the annotation specifies objects or fields that must be used in a transaction.

* * * * *